United States Patent
Kanagarajan

(10) Patent No.: US 10,727,941 B1
(45) Date of Patent: Jul. 28, 2020

(54) SYSTEMS AND METHODS FOR TRANSMITTING AND RECEIVING DATA USING LIGHT FIDELITY (LIFI) FOR IMPROVED AERODROME OPERATIONS

(71) Applicant: HONEYWELL INTERNATIONAL INC., Morris Plains, NJ (US)

(72) Inventor: Sivakumar Kanagarajan, TamilNadu (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/281,696

(22) Filed: Feb. 21, 2019

(51) Int. Cl.
*H04B 10/00* (2013.01)
*H04B 10/112* (2013.01)
*G08G 5/00* (2006.01)
*H04B 10/116* (2013.01)
*H04B 10/50* (2013.01)

(52) U.S. Cl.
CPC ......... *H04B 10/1125* (2013.01); *G08G 5/003* (2013.01); *H04B 10/116* (2013.01); *H04B 10/1123* (2013.01); *H04B 10/1127* (2013.01); *H04B 10/502* (2013.01)

(58) Field of Classification Search
CPC .... H04B 10/00; H04B 10/11; H04B 10/1123; H04B 10/1125; H04B 10/1127; H04B 10/1129; H04B 10/114; H04B 10/1143; H04B 10/116; H04B 10/12; H04B 10/14; H04B 10/40; G08G 5/0004; G08G 5/003; G08G 5/0034; G08G 5/0039; G08G 5/06; G08G 5/0065
See application file for complete search history.

(56) References Cited

U.S. PATENT DOCUMENTS 5,890,079 A * 3/1999 Levine .................... B64F 5/00
701/14
7,679,528 B1 3/2010 Etherington et al.
(Continued)

FOREIGN PATENT DOCUMENTS

CN 206945955 U 1/2018

OTHER PUBLICATIONS

Light-Fidelity (Li-Fi) based Flexible Automated Landing System for Small Unmanned Aircraft Systems; Publication Date: Jan. 24, 2018.

*Primary Examiner* — Van T Trieu
(74) *Attorney, Agent, or Firm* — Lorenz & Kopf, LLP

(57) ABSTRACT

A method for using an airfield Light Fidelity (LiFi) system in an airfield to exchange optical wireless data communications with an aircraft. The method (i) detects aircraft exterior lights including aircraft LED lamps, via a plurality of airfield photo detectors, wherein the airfield LiFi system comprises the plurality of airfield photo detectors positioned at intervals along a runway of the airfield; (ii) in response to detecting the aircraft exterior lights, establishes a communication connection to an aircraft LiFi system comprising the aircraft LED lamps and aircraft photo detectors, by the airfield LiFi system; and (iii) exchanges the optical wireless data communications via the communication connection, by the airfield LiFi system, by: receiving communications from aircraft LED lamps, via airfield photo detectors; transmitting communications to aircraft photo detectors, via airfield LED lamps; and presenting ground station notifications.

16 Claims, 12 Drawing Sheets

(56) References Cited

U.S. PATENT DOCUMENTS

| | | | |
|---|---|---|---|
| 8,880,328 B2 | 11/2014 | Ovens et al. | |
| 8,902,076 B2 | 12/2014 | Pederson et al. | |
| 2002/0105432 A1* | 8/2002 | Pederson | B60Q 1/2611 |
| | | | 340/815.45 |
| 2008/0310850 A1* | 12/2008 | Pederson | G07C 9/00158 |
| | | | 398/135 |
| 2010/0070115 A1* | 3/2010 | Villaume | B64D 45/04 |
| | | | 701/18 |
| 2016/0272344 A1* | 9/2016 | Degagne | B64F 1/20 |
| 2017/0032683 A1* | 2/2017 | Meserole, Jr. | G08G 5/0043 |

* cited by examiner

SYSTEMS AND METHODS FOR TRANSMITTING AND RECEIVING DATA USING LIGHT FIDELITY (LIFI) FOR IMPROVED AERODROME OPERATIONS

TECHNICAL FIELD

Embodiments of the subject matter described herein relate generally to applying Light Fidelity (LiFi) technology to the exchange of data communications in an aerodrome environment. More particularly, embodiments of the subject matter relate to transmitting and receiving optical wireless data communications via light and photo detection during performance of aerodrome operations.

BACKGROUND

Computer systems are significantly involved in various aspects of everyday life, and provide convenient access to information when needed. Location-independent information access increasingly depends on wireless data exchange, which is typically performed using standardized wireless communications protocols that include specified communication ranges of the radio frequency (RF) spectrum. The everyday use of personal computing devices is extensive, and continues to increase as technology advances. However, capacity limitations of the crowded RF spectrum can potentially constrain wireless data exchange requirements for advancements in computing technology.

Accordingly, it is desirable to expand wireless communications capabilities for computing applications. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for using an airfield Light Fidelity (LiFi) system in an airfield to exchange optical wireless data communications with an aircraft, the airfield LiFi system comprising at least a plurality of airfield light-emitting diode (LED) lamps, and at least one airfield processor. The method (i) detects aircraft exterior lights including at least one aircraft LED lamp, via a plurality of airfield photo detectors communicatively coupled to the at least one airfield processor, wherein the airfield LiFi system comprises the plurality of airfield photo detectors positioned at intervals along a runway of the airfield; (ii) in response to detecting the aircraft exterior lights, establishes a communication connection to an aircraft LiFi system comprising the at least one aircraft LED lamp and at least one aircraft photo detector, by the airfield LiFi system; and (iii) exchanges the optical wireless data communications via the communication connection, by the airfield LiFi system, by: receiving aircraft data communications from the at least one aircraft LED lamp onboard the aircraft, via the plurality of airfield photo detectors; transmitting airfield data communications to at least one aircraft photo detector onboard the aircraft, via the plurality of airfield LED lamps, wherein the optical wireless data communications comprise the aircraft data communications and the airfield data communications; and presenting ground station notifications associated with at least one of the aircraft data communications and the airfield data communications, via a display device communicatively coupled to the at least one airfield processor.

Some embodiments of the present disclosure provide an airfield Light Fidelity (LiFi) system positioned in an airfield and used to exchange optical wireless data communications with an aircraft. The airfield LiFi system includes: a plurality of airfield LED lamps configured to transmit the optical wireless data communications to an aircraft LiFi system onboard the aircraft, the plurality of airfield LED lamps being positioned at intervals along a runway of the airfield; a plurality of airfield photo detectors configured to receive the optical wireless data communications from the aircraft LiFi system, the plurality of airfield photo detectors being positioned at intervals along a runway of the airfield; a display device configured to present graphical elements and text for the airfield LiFi system; and at least one airfield processor communicatively coupled to the plurality of airfield LED lamps, the plurality of airfield photo detectors, and the display device, the at least one airfield processor configured to: detect aircraft exterior lights including at least one aircraft LED lamp, via the plurality of airfield photo detectors; in response to detecting the aircraft exterior lights, establish a communication connection to the aircraft LiFi system comprising the at least one aircraft LED lamp and at least one aircraft photo detector; and exchange the optical wireless data communications via the communication connection, by: receiving aircraft data communications from the at least one aircraft LED lamp onboard the aircraft, via the plurality of airfield photo detectors; transmitting airfield data communications to at least one aircraft photo detector onboard the aircraft, via the plurality of airfield LED lamps, wherein the optical wireless data communications comprise the aircraft data communications and the airfield data communications; and presenting ground station notifications associated with at least one of the aircraft data communications and the airfield data communications, via the display device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for transmitting and receiving data communications using Light Fidelity (LiFi) technology to enhance the safety and efficiency of aerodrome operations by: (i) enabling communications outside of the typical radio frequency (RF) spectrum; (ii) facilitating automatic data communication exchange between an aircraft in an airfield; and (iii) automatically predicting potential runway incursions and excursions prior to potential occurrence.

LiFi is wireless communications technology that uses light for data transmission. LiFi devices perform optical wireless communications, and typically use light from light-emitting diodes (LEDs) as a medium to deliver networked, mobile, high-speed communication. Advantages of using LiFi may include, but are not limited to: (1) the data transfer rate for internet applications is higher than typical data transmissions and provides an increased amount of security for data communication; (2) the Li-Fi devices consume a low amount of power for operation and are thus beneficial for use in Internet of Things (IoT) applications; (3) Li-Fi technology uses the optical spectrum and thus avoids using the already-crowded radio frequency (RF) spectrum; (4) Li-Fi systems operate using optical bands which are not known to be harmful to humans, and thus there are no known health concerns in a Li-Fi based system; (5) Li-Fi based devices and systems reduce the amount of energy required for a lighting applications; and (6) Li-Fi based devices and systems generally do not require complicated installation procedures, and thus are generally easy to install. Contemplated herein are techniques to exchange data communications between an aircraft onboard LiFi system and a LiFi system that has been deployed in an airfield and positioned at intervals along a runway, to facilitate communications and alerting between the aircraft and ground control station during landing and surface movement on the runway.

Figure 1:
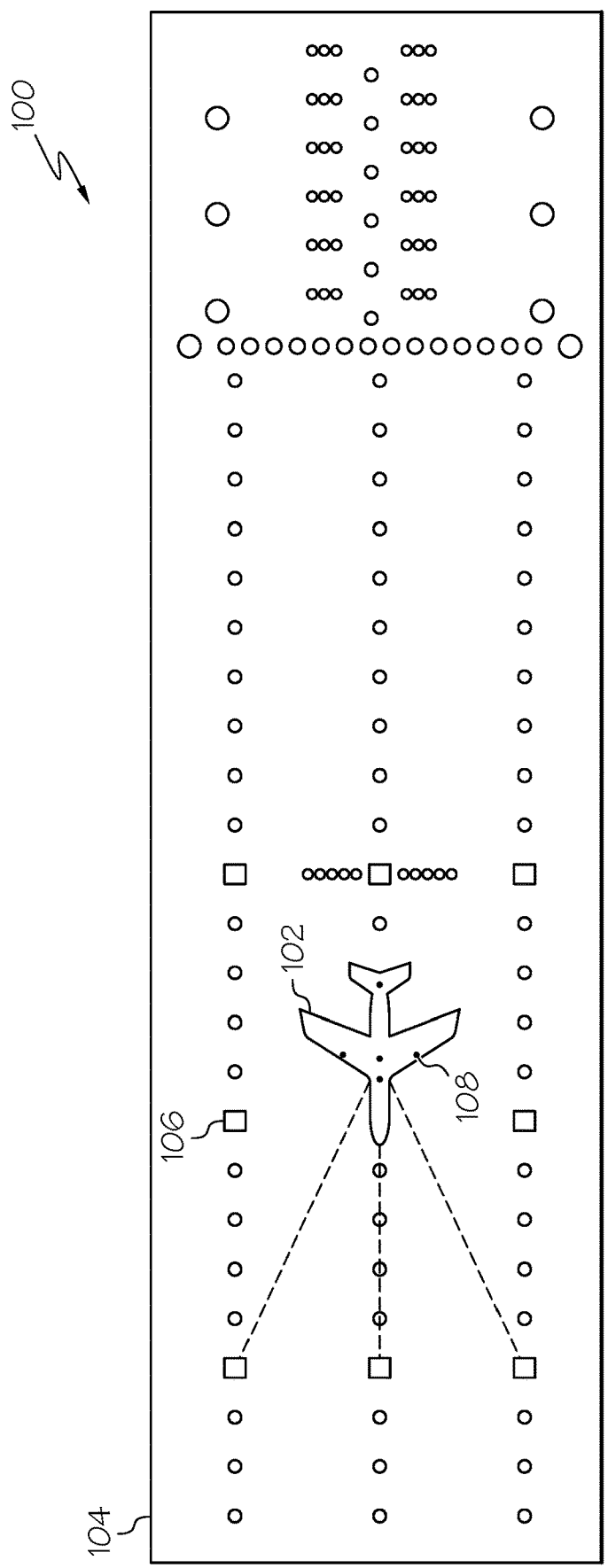
FIG. 1 is a diagram of a system for transmitting and receiving data using Light Fidelity (LiFi) technology during aerodrome operations performed by an aircraft landing in an airfield, in accordance with the disclosed embodiments.

Referring to the figures, FIG. 1 is a diagram of a system 100 for transmitting and receiving data using Light Fidelity (LiFi) technology during aerodrome operations, in accordance with the disclosed embodiments. More specifically, the system 100 is used to facilitate the exchange of LiFi data communications between: (1) an aircraft 102 landing in an airfield, and (2) a ground station associated with the airfield. The system 100 operates to enable the exchange of data between the aircraft 102 and the ground station using visible light communications (e.g., LiFi), for purposes of improving the safety and efficiency of aerodrome operations. The system 100 includes an aircraft 102 traveling on, or approaching, a runway 104 in an airfield associated with an air traffic control (ATC) tower or other ground station. The aircraft 102 is equipped with an aircraft LiFi system 108, and the ground station uses an airfield LiFi system 106 that includes LiFi device hardware positioned at intervals along the runway 104. In practice, certain embodiments of the system 100 may include additional or alternative elements and components, as desired for the particular application.

The aircraft 102 may be any aviation vehicle equipped with an aircraft LiFi system 108. The aircraft 102 may be implemented as an airplane, helicopter, spacecraft, hovercraft, or the like. The aircraft LiFi system 108 and the airfield LiFi system 106 are configured to exchange data communication messages as the aircraft 102 travels within a light detection range of the airfield LiFi system 106. As described herein with regard to FIGS. 2-3, the aircraft LiFi system 108 and the airfield LiFi system 106 include the same components, and each of the aircraft LiFi system 108 and the airfield LiFi system 106 include the capability to operate as a transmitter and a receiver. Using the aircraft LiFi system 108 and the airfield LiFi system 106, sets of data are transmitted using visible light communication techniques. Visible light communications operates by switching the current to the aircraft LED lamp off and on at a high rate, creating rapid changes in the LED beam that are typically not visible. Signal processing is used to convert the set of data into an LED-compatible format, and the set of data is provided to an LED lamp. The set of data is embedded in the LED beam generated by the LED lamp, and is transmitted at rapid speeds to a photo detector. The LED beam that includes rapid changes is received by the photo detector and then converted into an electrical signal, and then a binary data stream representative of the transmitted set of data, by a communicatively coupled computing device. In this way, the sets of data area transmitted via light emitting diode (LED) beams produced by a first LiFi system, and received via photo detectors of a second LiFi system. Thus, using visible light communication techniques, data messages are transmitted and received between the aircraft 102 and the ground station associated with the airfield and the runway 104.

During typical operation, the aircraft 102 approaches and lands on the runway 104, and the airfield LiFi system 106 detects exterior lights of the aircraft 102 when the aircraft 102 travels into a light detection range of the airfield LiFi system 106. Once the aircraft 102 is detected by the airfield LiFi system 106, communications are enabled between the aircraft 102 and the ground station via the airfield LiFi system 106. The airfield LiFi system 106 obtains real-time aircraft parameter data from the aircraft LiFi system 108 that is communicatively coupled to avionics systems onboard the aircraft 102. The airfield LiFi system 106 is further configured to use the obtained aircraft parameter data to identify situations in which performance of the aircraft 102 exceeds one or more thresholds, thus rendering aircraft operations outside of acceptable limits. In response to exceeding a performance threshold, the system 100 provides alerts and notifications to ground control and to the aircraft 102, to inform personnel of a situation requiring intervention.

Figure 2:
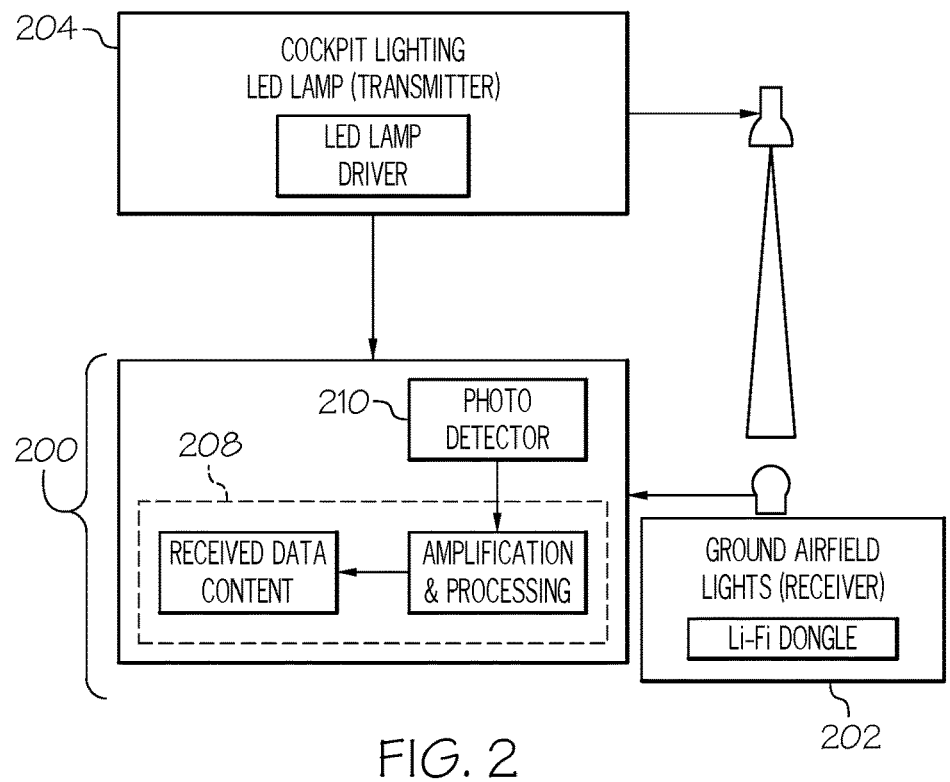
FIG. 2 is a functional block diagram of an airfield LiFi device operating as a receiver, in accordance with the disclosed embodiments.
Figure 3:
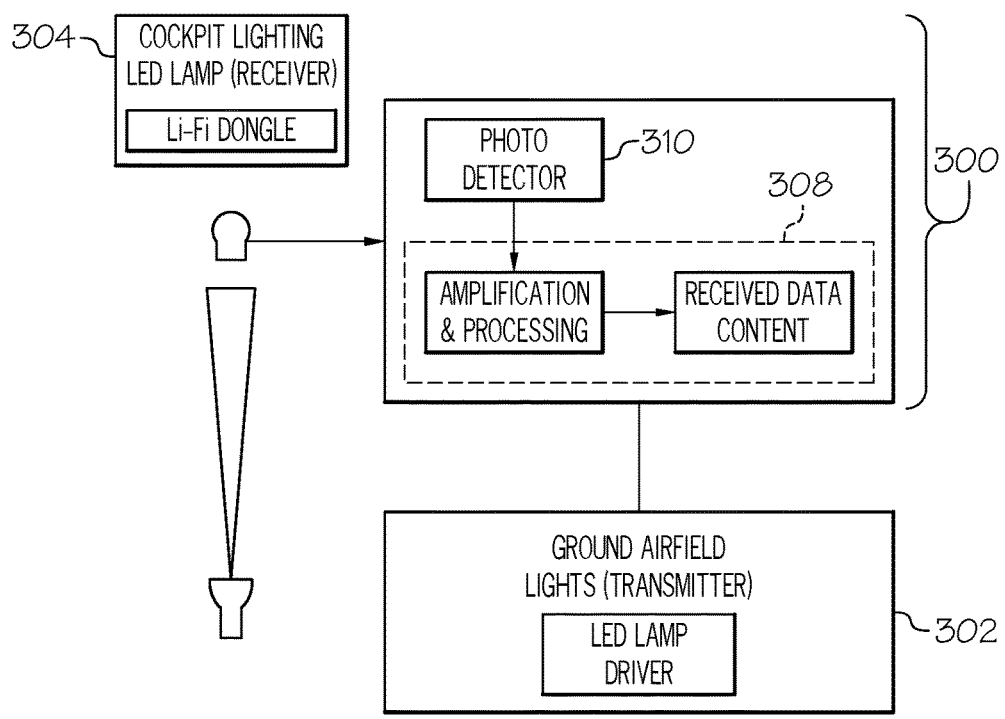
FIG. 3 is a functional block diagram of an aircraft LiFi device operating as a receiver, in accordance with the disclosed embodiments.

FIGS. 2 and 3 are functional block diagrams of LiFi devices implemented in a ground-based airfield and implemented onboard an aircraft, as shown in FIG. 1, references 106, 108. FIG. 2 is a functional block diagram of an airfield LiFi device 200 operating as a receiver that receives data communications transmitted by an aircraft LiFi device operating as a transmitter. The airfield LiFi device 200 is configured to exchange data communications with an aircraft LiFi device (see reference 300, FIG. 3).

The airfield LiFi device 200 includes ground airfield lights 202, an airfield LiFi computing device 208, and an airfield photo detector 210. The ground airfield lights 202 are implemented as airfield light emitting diode (LED) lamps configured to generate LED beams that include embedded data communications, for purposes of data transmission when the airfield LiFi device 200 operates as a transmitter, as described with regard to FIG. 3. However, in the embodiment shown in FIG. 2, the airfield LiFi device 200 operates as a receiver and the ground airfield lights 202 are not shown to operate as a transmitter in FIG. 2. The airfield photo detector 210 is implemented as a light sensor that detects and absorbs light, and that also converts the optical energy to measurable electric current. The airfield LiFi computing device 208 is implemented as any computing device that includes at least one processor, some form of memory hardware, and communication connections to the airfield photo detector 210 and the ground airfield lights 202.

During typical operation, the airfield LiFi device 200 operates as a receiver and, in this capacity, receives input data transmissions from an aircraft light emitting diode (LED) lamp transmitter 204. The airfield photo detector 210 detects an LED beam of light produced by the aircraft LED lamp transmitter 204. The airfield photo detector 210 converts the optical energy of the LED beam into an output electric current signal. Using the output data from the airfield photo detector 210, the airfield LiFi computing device 208 performs amplification and processing to convert the output data into a binary data stream representative of the input data transmission received from the aircraft LED lamp transmitter 204. Thus, the airfield LiFi device 200 receives a transmitted data communication via a beam of light.

FIG. 3 is a functional block diagram of an aircraft LiFi device 300 operating as a receiver that receives data communications transmitted by an airfield LiFi device operating as a transmitter. The aircraft LiFi device 300 is configured to exchange data communications with an airfield LiFi device (see reference 200, FIG. 2).

The aircraft LiFi device 300 includes aircraft lights 304, an aircraft LiFi computing device 308, and an aircraft photo detector 310. The airfield light emitting diode (LED) lamp transmitter 302 is implemented as airfield LED lamps configured to generate LED beams that include embedded data communications, for purposes of data transmission when the aircraft LiFi device 300 operates as a transmitter (as described with regard to FIG. 2). However, in the embodiment shown in FIG. 3, the aircraft LiFi device 300 operates as a receiver and the aircraft lights 304 are not shown to operate as a transmitter in FIG. 3. The aircraft photo detector 310 is implemented as a light sensor that detects and absorbs light, and that also converts the optical energy to measurable electric current. The aircraft LiFi computing device 308 is implemented as any computing device that includes at least one processor, some form of memory hardware, and communication connections to the aircraft photo detector 310 and the aircraft lights 304.

During typical operation, the aircraft LiFi device 300 operates as a receiver and, in this capacity, receives input data transmissions from the airfield LED lamp transmitter 302. The aircraft photo detector 310 detects an LED beam of light produced by the airfield LED lamp transmitter 302. The aircraft photo detector 310 converts the optical energy of the LED beam into an output electric current signal. Using the output data from the aircraft photo detector 310, the aircraft LiFi computing device 308 performs amplification and processing to convert the output data into a binary data stream representative of the input data transmission received from the airfield LED lamp transmitter 302. Thus, the aircraft LiFi device 300 receives a transmitted data communication via a beam of light.

Figure 4:
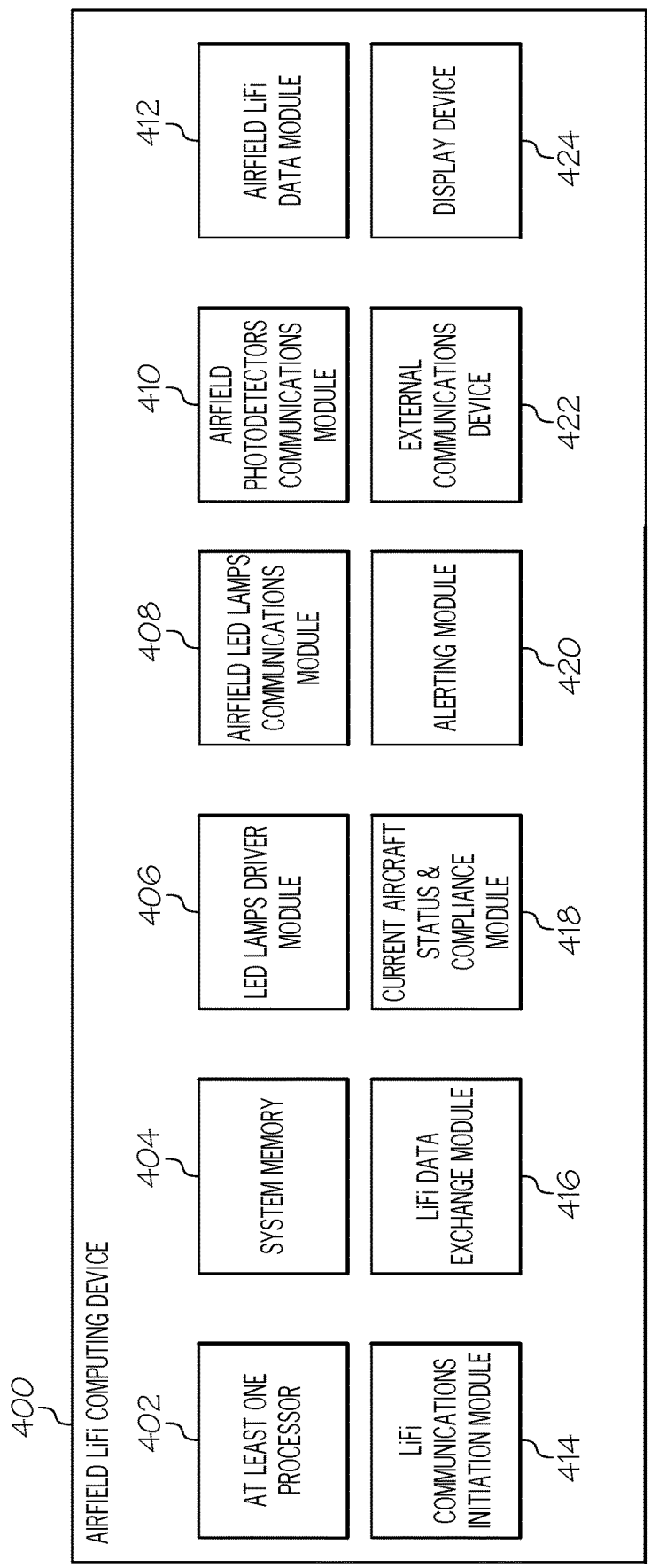
FIG. 4 is a functional block diagram of an airfield LiFi computing device, in accordance with the disclosed embodiments.

FIG. 4 is a functional block diagram of an airfield Light Fidelity (LiFi) computing device 400, in accordance with the disclosed embodiments. It should be noted that the airfield LiFi computing device 400 can be implemented as a component part of airfield LiFi system 106 depicted in FIG. 1 and the airfield LiFi computing device 208 of FIG. 2. In this regard, the airfield LiFi computing device 400 shows certain elements and components of the airfield LiFi system 106 and the airfield LiFi computing device 208 in more detail.

The airfield LiFi computing device 400 generally includes, without limitation: at least one processor 402; system memory 404; a light emitting diode (LED) lamps driver module 406; an airfield light emitting diode (LED) lamps communications module 408; an airfield photo detectors communications module 410; an airfield Light Fidelity (LiFi) data module 412; a Light Fidelity (LiFi) communications initiation module 414; a Light Fidelity (LiFi) data exchange module 416; a current aircraft status and compliance module 418; an alerting module 420; an external communications device 422; and a display device 424.

These elements and features of the airfield LiFi computing device 400 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 4. Moreover, it should be appreciated that embodiments of the airfield LiFi computing device 400 will include other elements, modules, and features that cooperate to support the desired functionality. For simplicity, FIG. 4 only depicts certain elements that relate to the LiFi data transmission techniques described in more detail below.

The at least one processor 402 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 402 may be realized as one or more microprocessors, controllers, microcontrollers, or state machines. Moreover, the at least one processor 402 may be implemented as a combination of computing devices, e.g., a combination of digital signal processors and microprocessors, a plurality of microprocessors, one or more microprocessors in conjunction with a digital signal processor core, or any other such configuration.

The at least one processor 402 is communicatively coupled to the system memory 404. The system memory 404 is configured to store any obtained or generated data and graphical elements associated with Light Fidelity (LiFi) signal transmission and/or conversion, identifying aircraft parameters exceeding normal limits, alerting and notifications for ground control and the aircraft. The system memory 404 may be realized using any number of devices, components, or modules, as appropriate to the embodiment. Moreover, the airfield LiFi computing device 400 could include system memory 404 integrated therein and/or a system memory 404 operatively coupled thereto, as appropriate to the particular embodiment. In practice, the system memory 404 could be realized as RAM memory, flash memory, EPROM memory, EEPROM memory, registers, a hard disk, a removable disk, or any other form of storage medium known in the art. In certain embodiments, the system memory 404 includes a hard disk, which may also be used to support functions of the airfield LiFi computing device 400. The system memory 404 can be coupled to the at least one processor 402 such that the at least one processor 402 can read information from, and write information to, the system memory 404. In the alternative, the system memory 404 may be integral to the at least one processor 402. As an example, the at least one processor 402 and the system memory 404 may reside in a suitably designed application-specific integrated circuit (ASIC).

The light emitting diode (LED) lamps driver module 406 is configured to initiate, enable, and configure operation of the airfield LED lamps and the airfield LiFi computing device 400. The LED lamps driver module 406 initiates or "triggers" typical light-generating operations of the LED lamps. The LED lamps driver module 406 also facilitates the signal processing, embedding data messages in light beams of the LED lamps, security of the data, and transmits the data message using the light beams. Thus, the LED lamps driver module 406 initiates normal LED lamp operations and LiFi data transmitting and receiving capabilities.

The airfield light emitting diode (LED) lamps communications module 408 is configured to provide data messages to the airfield LED lamps for transmission from the airfield LiFi computing device 400 to the aircraft LiFi system. The airfield LED lamps communications module 408 is further configured to obtain data messages from the airfield LED lamps that have been received by the airfield LiFi computing device 400 from the aircraft LiFi system via the airfield LED lamps. Thus, the airfield LED lamps communications module 408 exchanges data between the airfield LiFi computing device 400 and the communicatively coupled airfield LED lamps that are positioned at intervals along a runway of an airfield.

The airfield photo detectors communications module 410 is configured to obtain an output data signal from a plurality of airfield photo detectors used as component parts of an airfield LiFi system. Typically, the airfield photo detectors communications module 410 obtains and converts the output data signal into a binary data stream that represents the set of data received by the airfield LiFi system and transmitted by the aircraft LiFi system.

The airfield Light Fidelity (LiFi) data module 412 is configured to interpret the received LiFi data included in the binary data stream, and to identify appropriate actions for initiation and/or performance by the airfield LiFi computing device 400. In some embodiments, the received LiFi data includes aircraft position data, an aircraft identification number (e.g., an aircraft tail number), runway data, time data, aircraft speed data, flight plan data, aircraft compliance data, aircraft maintenance recorder data, or the like. In this scenario, the airfield LiFi computing device 400 obtains the uploaded aircraft parameter data, determines whether operation of the aircraft exceeds normal limits, whether the aircraft is operating in compliance with a published and approved flight plan, and whether current conditions indicate likelihood of a potential runway excursion and/or potential runway incursion.

The Light Fidelity (LiFi) communications initiation module 414 is configured to trigger or initiate the establishment of a communication connection between the airfield LiFi system and the aircraft LiFi system, for purposes of exchanging data using visible light communications by embedding a data communication message in a beam of light. Typically, the LiFi communications initiation module 414 initiates the establishment of the communication connection, and initiates all subsequent LiFi data exchanges using the communication connection, in response to detecting the presence of the exterior lights of the aircraft within a light detection range of the airfield photo detectors. Thus, the LiFi communications initiation module 414 initiates communication exchange between the airfield LiFi system and the aircraft LiFi system when the aircraft LiFi system is located within light-sensing range of the airfield LiFi system.

The Light Fidelity (LiFi) data exchange module 416 is configured to use the communication connection to transmit data via the plurality of airfield LED lamps and to receive data via the plurality of airfield photo detectors, after initiation of airfield LiFi system operations via the LiFi communications initiation module 414.

The current aircraft status and compliance module 418 is configured to perform analysis using received or uploaded aircraft parameter data to obtain the uploaded aircraft parameter data, determines whether operation of the aircraft exceeds normal limits, whether the aircraft is operating in compliance with a published and approved flight plan, and whether current conditions indicate likelihood of a potential runway excursion and/or potential runway incursion. The current aircraft status and compliance module 418 is further configured to use the obtained aircraft parameter data to identify situations in which performance of the aircraft exceeds one or more thresholds, thus rendering aircraft operations outside of acceptable limits.

In response to exceeding a performance threshold, the alerting module 420 provides alerts and notifications to ground control and to the aircraft 102, to inform personnel of a situation requiring intervention. The alerting module 420 is thus configured to transmit alerts and notifications to the aircraft LiFi system using the visible light communications techniques of the airfield LiFi system.

The external communications device 422 is suitably configured to communicate data between the airfield LiFi computing device 400 and one or more remote storage locations (e.g., a server, system memory 404, or other memory hardware location). The external communications device 422 may transmit and receive communications over a wireless local area network (WLAN), the Internet, a satellite uplink/downlink, a cellular network, a broadband network, a wide area network, or the like. As described herein, the airfield LiFi computing device 400 uses airfield LED lamps, airfield photo detectors, and visible light communications techniques to transmit and receive data communications embedded in LED beams. However, the airfield LiFi computing device 400 uses the external communications device 422 to transmit and receive data that is outside of the LiFi communication connection between the LiFi systems. In this way, the external communications device 422 uses typical wireless and/or wired communication protocols to transmit data uploads for storage, record-keeping, and future use.

The display device 424 is configured to display various icons, text, and/or graphical elements associated with LiFi data messages, LiFi data conversion, LiFi data transmission techniques, or the like. In an exemplary embodiment, the display device 424 is communicatively coupled to the at least one processor 402. The at least one processor 402 and the display device 424 are cooperatively configured to display, render, or otherwise convey one or more graphical representations or images associated with LiFi data transmission, LiFi data conversion, and/or notifications and alerts related to aircraft performance parameters exceeding normal limits. In an exemplary embodiment, the display device 424 is realized as an electronic display configured to graphically display LiFi data transmission and conversion data and alerting and notification data, as described herein. In some embodiments, the display device 424 is external to the airfield LiFi computing device 400 such that the display device 424 is capable of presenting notifications and alerts in a ground station, and is thus implemented as a ground station display. It will be appreciated that although the display device 424 may be implemented using a single display, certain embodiments may use additional displays (i.e., a plurality of displays) to accomplish the functionality of the display device 424 described herein.

Figure 5:
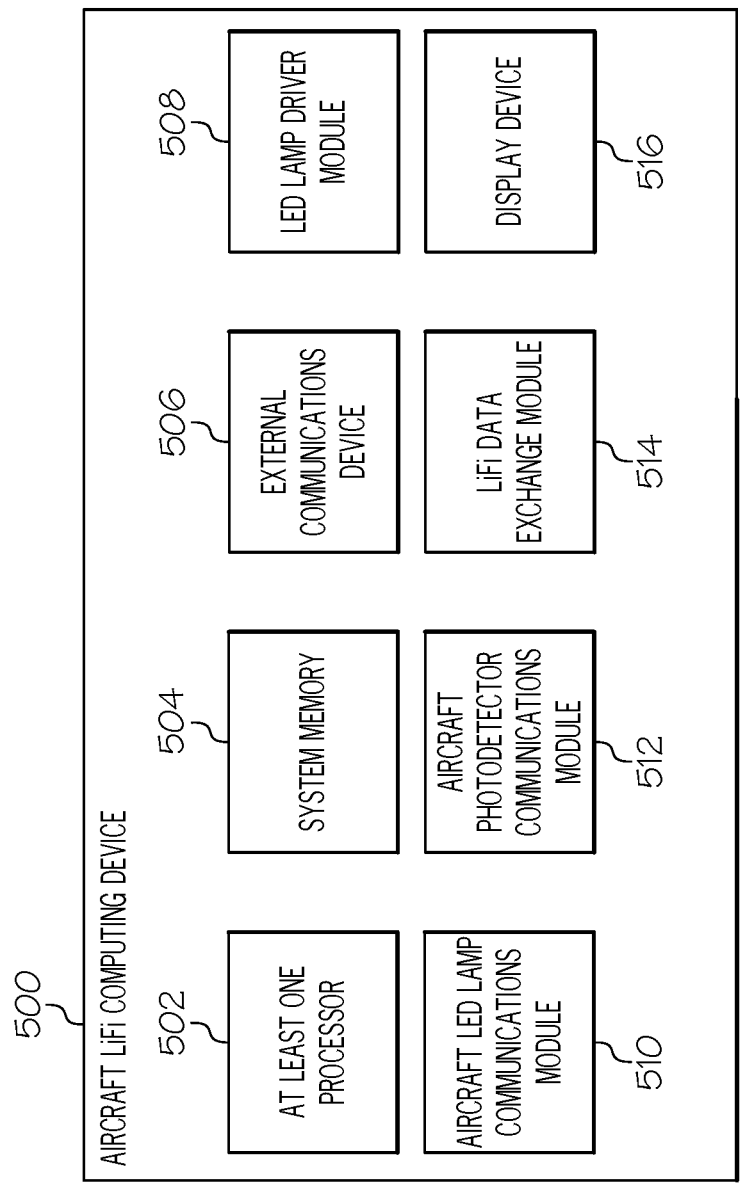
FIG. 5 is a functional block diagram of an aircraft LiFi computing device, in accordance with the disclosed embodiments.

FIG. 5 is a functional block diagram of an aircraft Light Fidelity (LiFi) computing device 500, in accordance with the disclosed embodiments. Many of the features, components, and functionality of the aircraft LiFi computing device 500 are similar (if not identical) to those described above with reference to FIG. 4. For the sake of brevity and clarity, shared or common features, components, and functionality will not be redundantly described here in the context of the aircraft LiFi computing device 500.

More specifically, the at least one processor 502, the system memory 504, the external communications device 506, the light emitting diode (LED) lamp driver module 508, the aircraft light emitting diode (LED) lamp communications module 510, the aircraft photo detector communications module 512, the Light Fidelity (LiFi) data exchange module 514, and the display device 516 correspond to similar components that are described with regard to FIG. 4. However, exemplary embodiments of the display device 516 are realized as an electronic display configured to graphically display LiFi data transmissions, LiFi conversion data, alerting and notification data associated with aircraft performance, as described herein. In some embodiments, the aircraft LiFi computing device 500 is an integrated computer system onboard the aircraft, and the display device 516 is located within a cockpit of the aircraft, and is thus implemented as an aircraft display. In other embodiments, the display device 516 is implemented as a display screen of a standalone, personal computing device (e.g., laptop computer, tablet computer) that is communicatively coupled to the aircraft LiFi computing device 500. It will be appreciated that although the display device 516 may be implemented using a single display, certain embodiments may use additional displays (i.e., a plurality of displays) to accomplish the functionality of the display device 516 described herein.

It should be appreciated that the aircraft LiFi computing device 500 is configured to operate cooperatively with an aircraft LiFi system (see FIGS. 2-3) to exchange data communications with the plurality of aircraft onboard LED lamps via the aircraft LED lamp communications module 510; to exchange data communications with the plurality of aircraft onboard photo detectors via the aircraft photo detector communications module 512; to transmit and receive data communications with an airfield LiFi system via the LiFi data exchange module 514, and to present notifications and alerts generated or obtained using the aircraft LiFi system via the display device 516.

Figure 6:
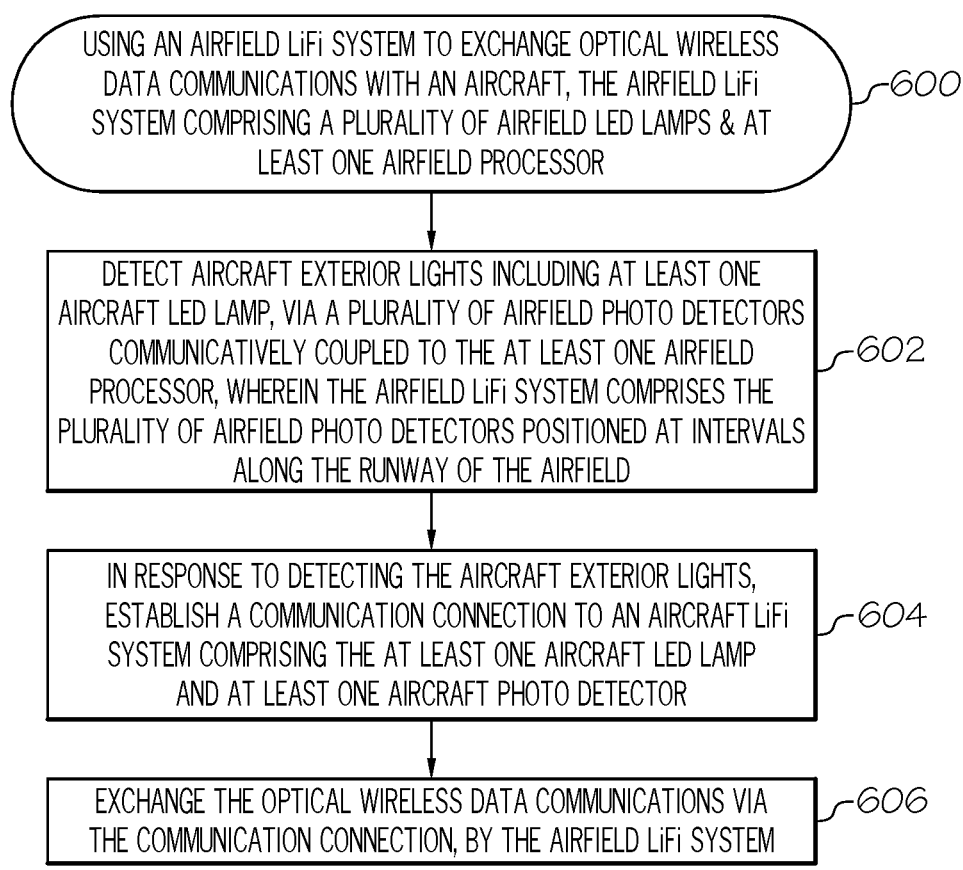
FIG. 6 is a flow chart that illustrates an embodiment of a process for using an airfield LiFi system in an airfield to exchange optical wireless communications with an aircraft, in accordance with the disclosed embodiments.

FIG. 6 is a flow chart that illustrates an embodiment of a process 600 for using an airfield Light Fidelity (LiFi) system in an airfield to exchange optical wireless communications with an aircraft, in accordance with the disclosed embodiments. As described previously with regard to reference 106 of FIG. 1, the airfield LiFi system includes a plurality of airfield light emitting diode (LED) lamps, a plurality of airfield photo detectors, and at least one airfield processor.

For ease of description and clarity, it is assumed that the process 600 begins by detecting aircraft exterior lights including at least one aircraft LED lamp, via the plurality of airfield photo detectors of the airfield LiFi system (step 602). Generally, the airfield photo detectors are used to receive light-based data transmissions from aircraft LED lamps. Here, the airfield LiFi system includes the plurality of airfield photo detectors positioned at intervals along the runway of the airfield, and the airfield photo detectors function to detect that the aircraft includes activated exterior lights and that the aircraft has traveled within a light detection proximity of the airfield photo detectors. Thus, the aircraft is traveling within the aerodrome during landing or during performance of surface operations on the ground.

In response to detecting the aircraft exterior lights, the process 600 establishes a communication connection to an aircraft LiFi system comprising the at least one aircraft LED lamp and at least one aircraft photo detector, by the airfield LiFi system (step 604). The communication connection permits the airfield LiFi system to communicate with the aircraft LiFi system using light. As described previously with regard to FIGS. 1-3, the airfield LiFi system and the aircraft LiFi system use transmitters in the form of light emitting diodes (LEDs) and receivers in the form of photo detectors to perform the data exchange. The process 600 then exchanges the optical wireless data communications via the communication connection, by the airfield LiFi system (step 606). One suitable methodology for exchanging the optical wireless data communications is described below with reference to FIG. 7. Here, the process 600 enables the exchange of light-based data communications when the aircraft, and therefore the aircraft LiFi system, are positioned within a light detection range of the plurality of airfield photo detectors.

Figure 7:
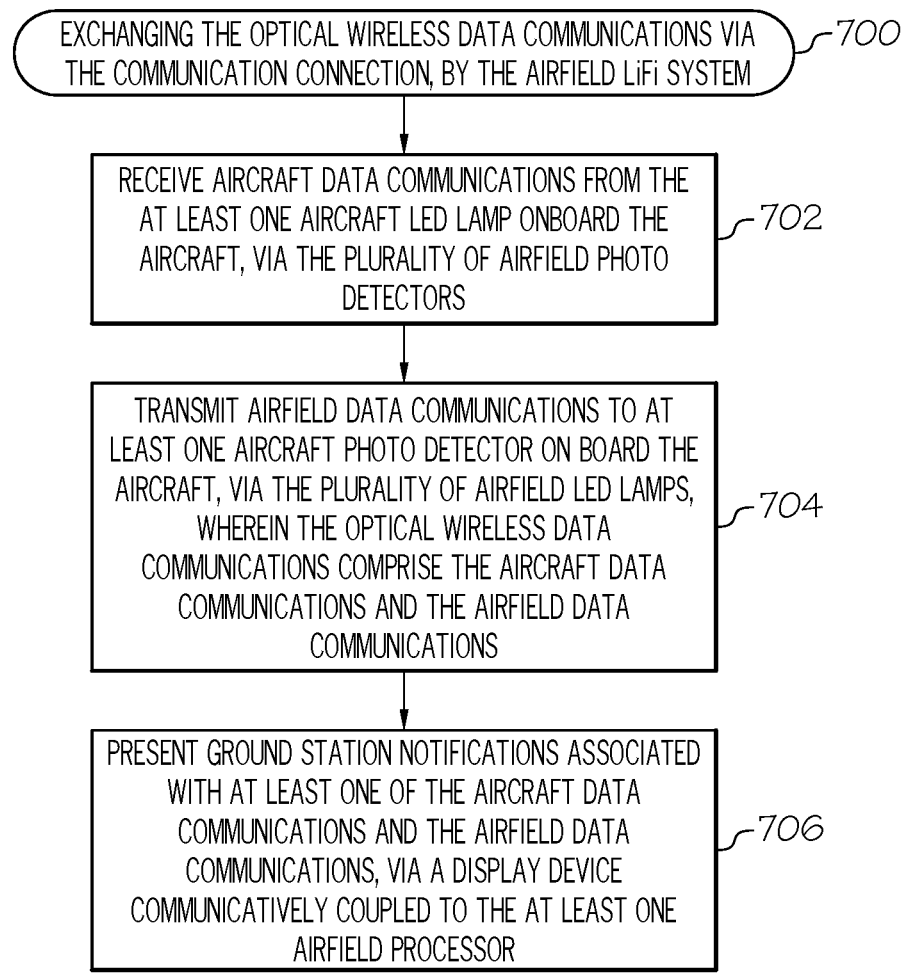
FIG. 7 is a flow chart that illustrates an embodiment of a process for exchanging optical wireless data communications via a communication connection between an airfield LiFi system and an aircraft LiFi system, in accordance with the disclosed embodiments.

FIG. 7 is a flow chart that illustrates an embodiment of a process 700 for exchanging optical wireless data communications via a communication connection between an airfield LiFi system and an aircraft LiFi system, in accordance with the disclosed embodiments. It should be appreciated that the process 700 described in FIG. 7 represents one embodiment of step 606 described above in the discussion of FIG. 6, including additional detail.

First, the process 700 receives aircraft data communications from the at least one aircraft LED lamp onboard the aircraft, via the plurality of airfield photo detectors (step 702). One suitable methodology for receiving aircraft data communications from the at least one aircraft LED lamp onboard the aircraft is described below with reference to FIG. 12. The process 700 receives any type of data transmission in the form of light from an LED lamp onboard the aircraft, when the aircraft is positioned within light detection range of at least one photodetector in the airfield. Here, the aircraft LED lamp operates as a transmitter and the airfield photo detector operates as a receiver. The aircraft LiFi system uses visible light communications to transmit a set of data to the airfield LiFi system. Visible light communications operates by switching the current to the aircraft LED lamp off and on at a very high rate, creating rapid changes in the LED beam. The aircraft LiFi system provides the set of data intended for transmission to ground control to an aircraft LED lamp using signal processing technology, and transmits the set of data embedded in the LED beam at rapid speeds to the airfield photo detector. The LED beam and included rapid changes are received and then converted by the airfield LiFi system into an electrical signal. The airfield LiFi system converts the electrical signal into a binary data stream representative of the set of data. Embodiments of data transmissions may include aircraft identification data, aircraft parameter data (e.g., aircraft type and other aircraft specifications), real-time avionics system data obtained during flight, or the like.

Exemplary embodiments of data transmissions received from the aircraft LiFi system may include at least one of an aircraft tail number, real-time aircraft position data, aircraft maintenance data, runway data, time data, and a current aircraft speed, and wherein the aircraft data communications comprise at least the aircraft data. The process 700 is capable of using aircraft data received from the aircraft LED lamps to determine whether the aircraft currently complies with a published approved flight plan based on the aircraft data, by the at least one airfield processor, wherein flight plan compliance indicates that the aircraft currently complies with the published approved flight plan. In this scenario, when the aircraft does not currently comply with the published approved flight plan, the process 700 transmits an alert to the aircraft via the plurality of airfield LED lamps, wherein the alert includes a notification that the aircraft does not currently comply with the published approved flight plan, and wherein the airfield data communications comprise the alert; and presents the alert via the display device, wherein the ground station notifications include the alert.

Next, the process 700 transmits airfield data communications to at least one aircraft photo detector onboard the aircraft, via the plurality of airfield LED lamps, wherein the optical wireless data communications comprise the aircraft data communications and the airfield data communications (step 704). One suitable methodology for transmitting airfield data communications to at least one aircraft photo detector onboard the aircraft is described below with reference to FIG. 11. Here, the transmitter operations are switched from the aircraft LED lamp to the airfield LED lamp, and the receiver operations are switched from the airfield photo detector to the aircraft photo detector. Thus, the airfield LED lamp operates as a transmitter and the aircraft photo detector operates as a receiver. The airfield LiFi system uses visible light communications to transmit a set of data to the aircraft LiFi system, in a manner described previously with regard to step 702. The aircraft LiFi system then converts the electrical signal into a binary data stream representative of the set of data. Exemplary embodiments of data transmissions may include alerts and notifications applicable to current aircraft operations, data applicable to various aircraft onboard systems, data instructions that include flight crew procedures, or the like.

The process 700 then presents ground station notifications associated with at least one of the aircraft data communications and the airfield data communications, via a display device communicatively coupled to the at least one airfield processor (step 706). Here, the process 700 alerts personnel at a ground station that one or more parameters associated with the aircraft and received from the aircraft, the flight plan, the phase of flight, and/or any other data parameter for the aircraft, has been violated, has not been violated, has changed, or has not changed. Ground station notifications may include any type of visual indication presented by a display (e.g., a banner, graphical elements, text, flashing lights, distinguishing visual characteristics), or an audio indication presented by a speaker or headset (e.g., a spoken notification, an alarm, a tone).

Figure 8:
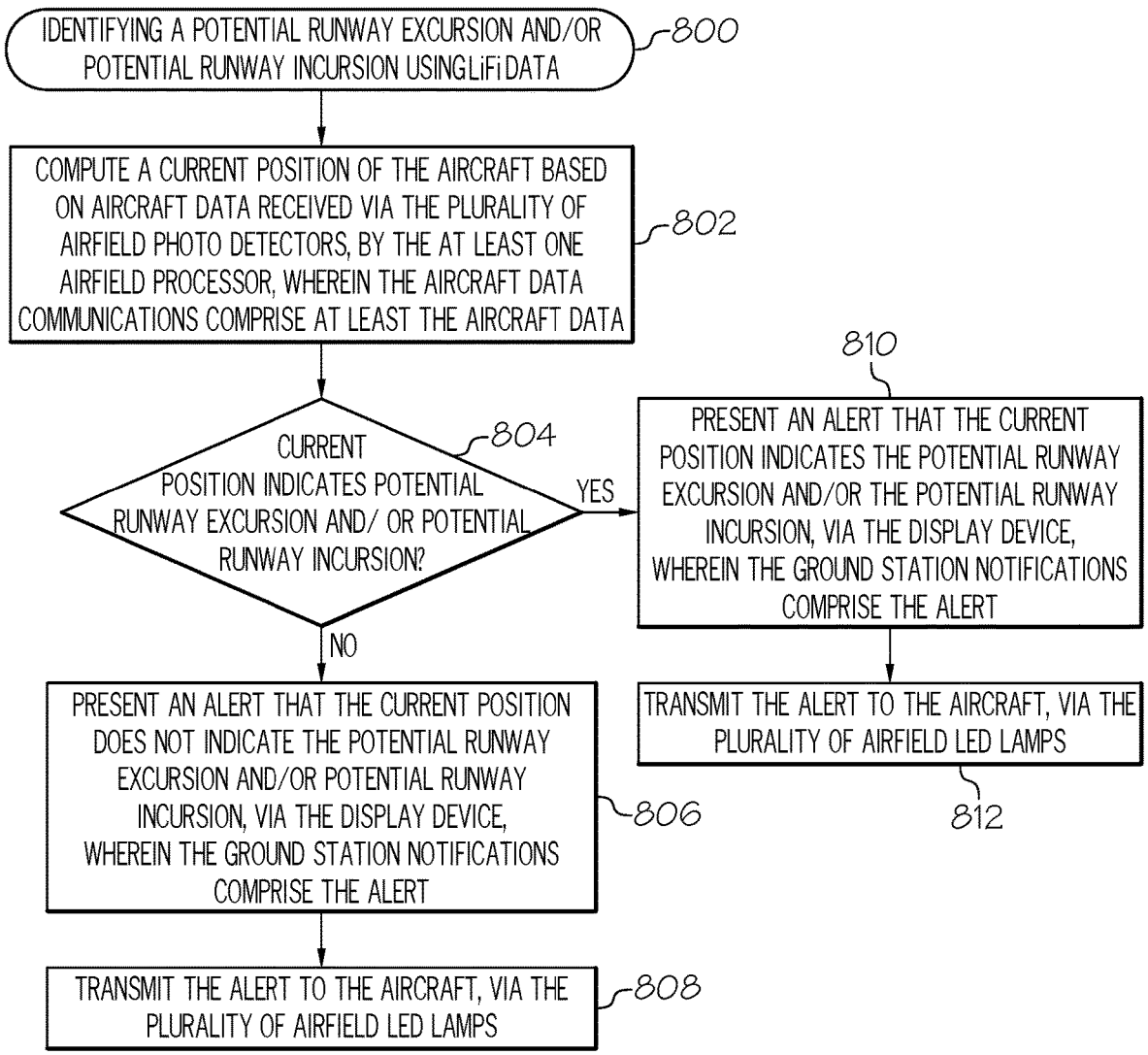
FIG. 8 is a flow chart that illustrates an embodiment of a process for identifying potential aircraft runway excursions and/or potential runway incursions, using a LiFi system, in accordance with the disclosed embodiments.

FIG. 8 is a flow chart that illustrates an embodiment of a process 800 for identifying potential aircraft runway excursions and/or potential runway incursions using a LiFi system, in accordance with the disclosed embodiments. First, the process 800 computes a current position of the aircraft based on aircraft data received via the plurality of airfield photo detectors, by the at least one airfield processor, wherein the aircraft data communications comprise at least the aircraft data (step 802). One suitable methodology for computing a current position of the aircraft using aircraft data received via the plurality of airfield photo detectors is described below with reference to FIG. 9.

The process 800 then determines whether the current position indicates a potential runway excursion and/or a potential runway incursion (decision 804). One suitable methodology for determining whether the current position indicates a potential runway excursion is described below with reference to FIG. 10. One suitable methodology for determining whether the current position indicates a potential runway incursion is described below with reference to FIG. 13. A runway excursion is an improper aircraft exit from a current runway, such as a runway overrun. A runway incursion is any occurrence at an aerodrome involving the incorrect presence of an aircraft, vehicle, or person on the protected area of a surface designated for the landing and take-off of aircraft. Here, the process 800 uses a position of the aircraft that has been determined using an airfield LiFi system in communication with an aircraft LiFi system to compute whether a potential runway excursion and/or a potential runway incursion may occur, based on the current position.

When the current position does not indicate that a potential runway excursion and/or potential runway incursion can potentially occur, the process 800 presents an alert that the current position does not indicate the potential runway excursion, via the display device, wherein the ground station notifications comprise the alert (step 806) and transmits the alert to the aircraft, via the plurality of airfield LED lamps (step 808). However, when the current position does indicate that the potential runway excursion can potentially occur, the process 800 presents an alert that the current position indicates the potential runway excursion, via the display device (step 810), and transmits the alert to the aircraft, via the plurality of airfield LED lamps, wherein the alert includes a notification of the potential runway excursion (step 812).

Figure 9:
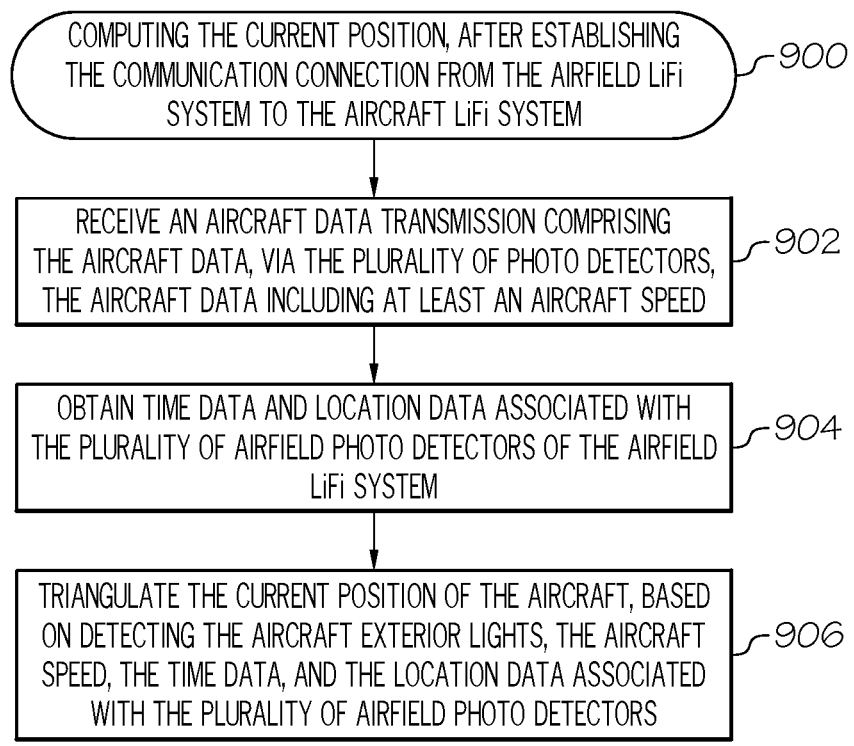
FIG. 9 is a flow chart that illustrates an embodiment of a process for computing a current aircraft position based on aircraft LiFi data transmissions, in accordance with the disclosed embodiments.

FIG. 9 is a flow chart that illustrates an embodiment of a process 900 for computing a current aircraft position based on aircraft LiFi data transmissions, in accordance with the disclosed embodiments. It should be appreciated that the process 900 described in FIG. 9 represents one embodiment of step 802 described above in the discussion of FIG. 8, including additional detail. First, after establishing the communication connection, the process 900 receives an aircraft data transmission comprising the aircraft data, via the plurality of airfield photo detectors, the aircraft data including at least an aircraft speed (step 902). In certain embodiments of the process 900, the aircraft data also includes an aircraft identification number or tail number, landed runway information, a current time value for performing computations, and other necessary aircraft parameters.

The process 900 then obtains time data (if not already received via the airfield photo detectors) and location data associated with the plurality of airfield photo detectors of the airfield LiFi system (step 904). Each of the plurality of airfield photo detectors and the airfield LED lamps are positioned at regular intervals along the runway of the airfield, and thus, each airfield photo detector and ach airfield LED is associated with a physical location. The process 900 triangulates the current position of the aircraft, based on detecting the aircraft exterior lights, the aircraft speed, the time data, and the location data associated with the plurality of airfield photo detectors. Here, the process 900 detects aircraft exterior lights at a particular time and at a particular location of the detecting photo detector. The process 900 also obtains the aircraft speed, via the photo detectors. Using the time, location, and speed of the aircraft when detected, the process 900 is capable of determining a current location of the moving aircraft, wherein the current location is used to identify conditions for potential runway excursions and/or potential runway incursions, as described previously with regard to FIG. 8.

Figure 10:
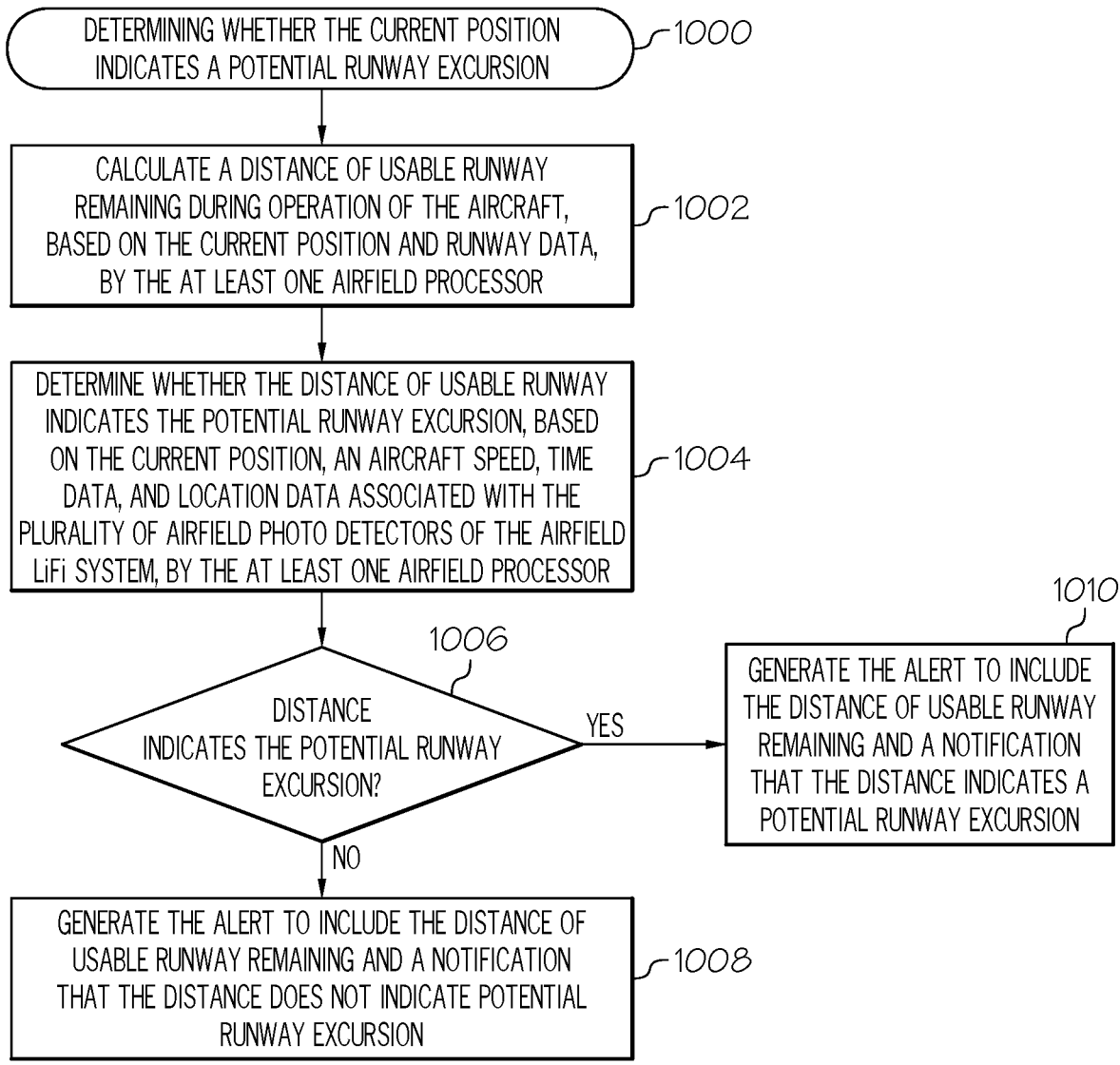
FIG. 10 is a flow chart that illustrates an embodiment of a process for determining whether a current aircraft position indicates a runway excursion, in accordance with the disclosed embodiments.

FIG. 10 is a flow chart that illustrates an embodiment of a process 1000 for determining whether a current aircraft position indicates a runway excursion, in accordance with the disclosed embodiments. It should be appreciated that the process 1000 described in FIG. 10 represents one embodiment of decision 804 described above in the discussion of FIG. 8, including additional detail. The process 1000 calculates a distance of usable runway remaining during operation of the aircraft, based on the current position and runway data, by the at least one airfield processor (step 1002). The process 1000 may receive runway parameters and specifications via LiFi system transmission from the aircraft, or the process 1000 may access the runway parameters and specifications from a memory storage location. Based on the current position of the aircraft and the parameters specific to one particular runway, the process 1000 is capable of calculating the remaining distance of the runway that is ahead of the aircraft during traveling.

The process 1000 then determines whether the distance of usable runway indicates the potential runway excursion, by the at least one airfield processor, based on the current position, an aircraft speed, time data, and location data associated with the plurality of airfield photo detectors of the airfield LiFi system (step 1004). Here, the process 1000 is capable of determining whether the aircraft requires a greater distance than the available distance in order to stop, when the aircraft is traveling at a particular speed, at a particular time, and at a particular location.

When the process 1000 determines that the distance does not indicate the potential runway excursion, the process 1000 generates the alert to include the distance of usable runway remaining and a notification that the distance does not indicate a potential runway excursion (step 1008). However, when the process 1000 determines that the distance does indicate the potential runway excursion, the process 1000 generates the alert to include the distance of usable runway remaining and a notification that the distance does indicate a potential runway excursion (step 1008). As described previously with regard to FIGS. 7-8, the alert is a notification presented to ground personnel at air traffic control (ATC) or other ground station and transmitted to the aircraft via the LiFi system for presentation to the flight crew onboard the aircraft. In this scenario, the alert is generated to notify ground personnel and the flight crew of the aircraft of a length of usable runway that is still available for use and whether a potential runway excursion is likely to occur based on current conditions.

Figure 11:
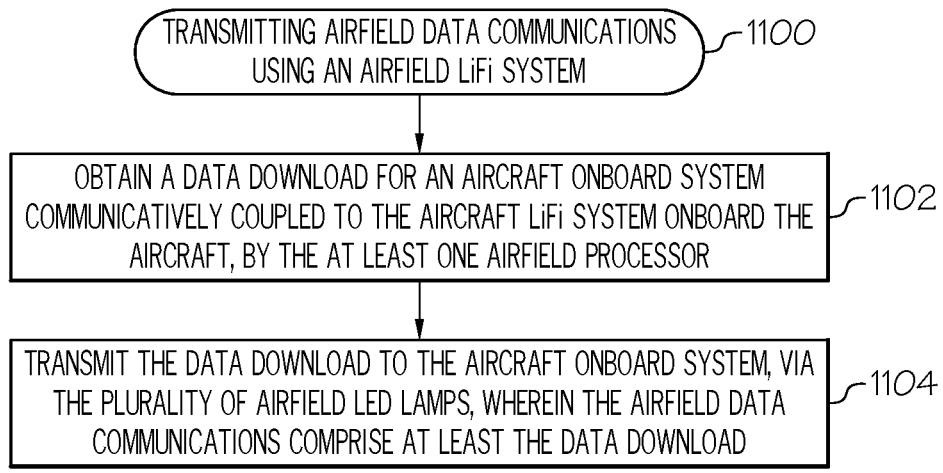
FIG. 11 is a flow chart that illustrates an embodiment of a process for transmitting airfield data communications using an airfield LiFi system, in accordance with the disclosed embodiments.

FIG. 11 is a flow chart that illustrates an embodiment of a process 1100 for transmitting airfield data communications using an airfield LiFi system, in accordance with the disclosed embodiments. In this embodiment, the airfield LiFi system is used as the transmitter and an aircraft LiFi system is used as a receiver, such that a ground station transmits data to the aircraft. It should be appreciated that the process 1100 described in FIG. 11 represents one embodiment of step 704 described above in the discussion of FIG. 7, including additional detail.

The process 1100 obtains a data download for an aircraft onboard system communicatively coupled to the aircraft LiFi system onboard the aircraft, by the at least one airfield processor (step 1102). The aircraft onboard system is any system communicatively coupled to the aircraft LiFi system, and the data download is any set of data that can be downloaded and used by the aircraft onboard system. Here, the process 1100 accesses a local or remote data storage location and obtains the data download for the aircraft onboard system.

The process 1100 then transmits the data download to the aircraft onboard system, via the plurality of airfield LED lamps, wherein the airfield data communications comprise at least the data download (step 1104). Here, the process 1100 uses the airfield LED lamps to transmit the data download, as changes/variations of an LED beam of light, to the aircraft photo detectors, and the aircraft LiFi system processes the changed/varied LED beam of light to convert the changes/variations into a binary stream of data representative of the data download.

In certain embodiments, the data download includes a software update for the aircraft onboard system, wherein the process 1100 obtains a software update for an avionics system, by the at least one airfield processor, wherein the data download comprises at least the software update, and wherein the aircraft onboard system comprises the avionics system. The process 1100 then initiates updating of the avionics system by transmitting the data download via the airfield LED lamps. In other embodiments, the data download includes media content for an aircraft onboard entertainment system, wherein the process 1100 obtains media content for an aircraft onboard entertainment system, by the at least one airfield processor, wherein the data download comprises at least the media content, and wherein the aircraft onboard system comprises the aircraft onboard entertainment system. The process 1100 thus provides the media content to the aircraft onboard entertainment system by transmitting the data download via the airfield LED lamps.

Figure 12:
FIG. 12 is a flow chart that illustrates an embodiment of a process for receiving aircraft data communications using an airfield LiFi system, in accordance with the disclosed embodiments.

FIG. 12 is a flow chart that illustrates an embodiment of a process 1200 for receiving aircraft data communications using an airfield LiFi system, in accordance with the disclosed embodiments. In this embodiment, the airfield LiFi system is used as the receiver and an aircraft LiFi system is used as a transmitter, such that the aircraft transmits data to the ground station using the LiFi system. It should be appreciated that the process 1200 described in FIG. 12 represents one embodiment of step 702 described above in the discussion of FIG. 7, including additional detail.

The process 1200 receives a data upload from the at least one aircraft LED lamp of the aircraft LiFi system onboard the aircraft, via the at least one airfield photo detector (step 1202). Here, the aircraft has transmitted a set of data to the ground station in the form of a data upload, using an LED beam of light generated by the aircraft LED lamps of the aircraft LiFi system. The set of data transmitted by the aircraft and received by the ground station may be used to perform analysis and/or stored for record-keeping purposes and potential later use.

In response to receiving the data upload, the process 1200 transmits the data upload to a storage location, via a communication device communicatively coupled to the at least one airfield processor, wherein the aircraft data communications comprise at least the data upload (step 1204). Here, the data upload is transmitted to a memory storage location and stored for later retrieval and use or for record-keeping purposes. Also in response to receiving the data upload, the process 1200 presents an alert for the data upload, via the display device, wherein the ground station notifications comprise at least the alert (step 1206). The process 1200 presents the alert for the data upload, to inform ground station personnel that a set of data has been received from the aircraft, via the airfield LiFi system. In some embodiments, the data upload includes maintenance data from the aircraft, as described below with reference to FIG. 14.

Figure 13:
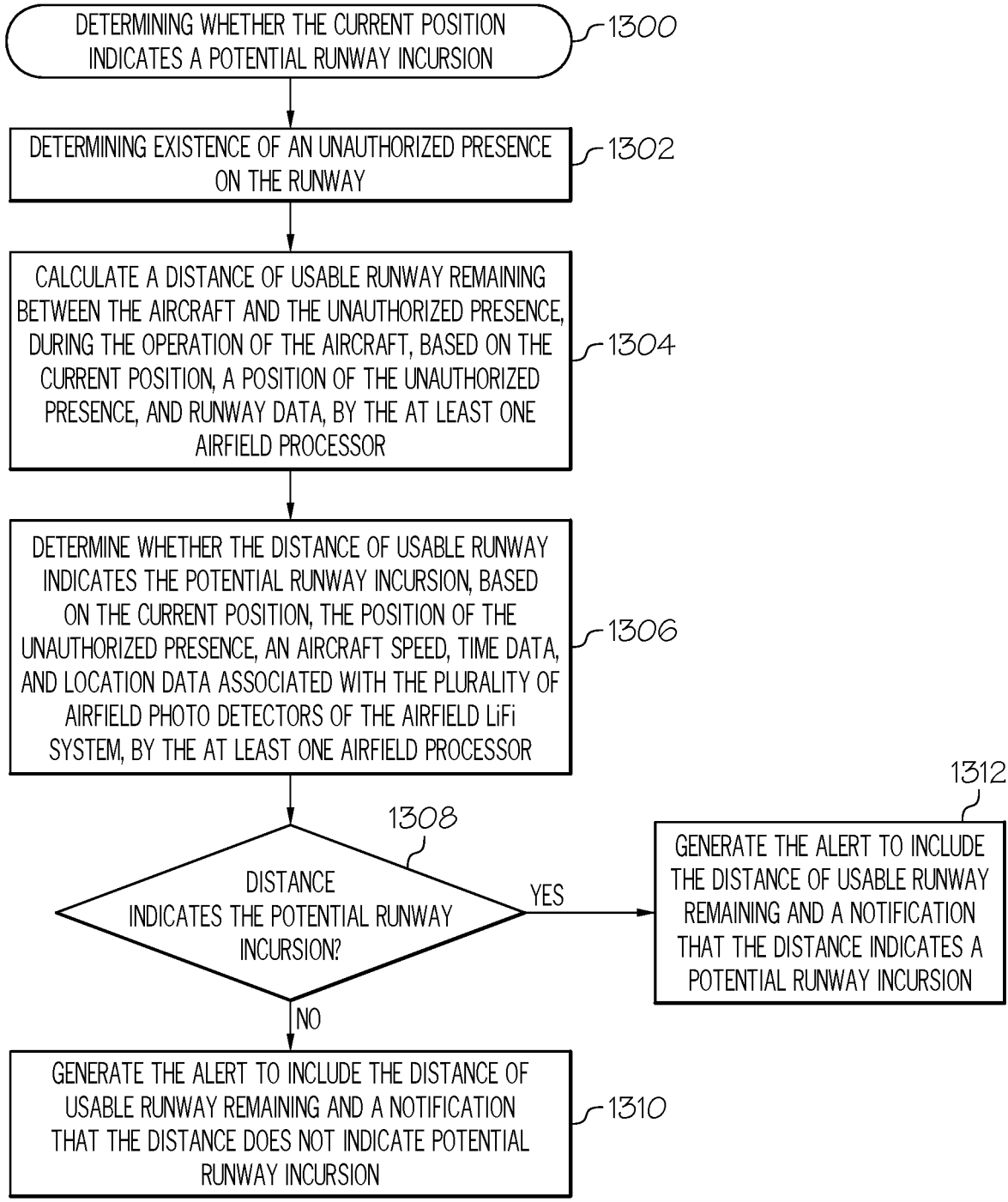
FIG. 13 is a flow chart that illustrates an embodiment of a process for determining whether a current aircraft position indicates a runway incursion, in accordance with the disclosed embodiments.

FIG. 13 is a flow chart that illustrates an embodiment of a process 1300 for determining whether a current aircraft position indicates a runway incursion, in accordance with the disclosed embodiments. It should be appreciated that the process 1300 described in FIG. 13 represents one embodiment of decision 804 described above in the discussion of FIG. 8, including additional detail. First, the process 1300 determines existence of an unauthorized presence on the runway (step 1302). The unauthorized presence on the runway may include any unauthorized aircraft, vehicle, or person present on the current runway in use by the aircraft for take-off or landing purposes.

The process 1300 then calculates a distance of usable runway remaining between the aircraft and the unauthorized presence, during operation of the aircraft, based on the current position, a position of the unauthorized presence, and runway data, by the at least one airfield processor (step 1304). The process 1300 may receive runway parameters and specifications via LiFi system transmission from the aircraft, or the process 1300 may access the runway parameters and specifications from a memory storage location. Based on the current position of the aircraft, the current position of the unauthorized presence, and the parameters specific to one particular runway, the process 1300 is capable of calculating the remaining distance of the runway that is ahead of the aircraft, prior to a potential collision between the aircraft and the unauthorized presence, during traveling.

The process 1300 then determines whether the distance of usable runway indicates the potential runway incursion, by the at least one airfield processor, based on the current position, the position of the unauthorized presence, an aircraft speed, time data, and location data associated with the plurality of airfield photo detectors of the airfield LiFi system (step 1306). Here, the process 1300 is capable of determining whether the aircraft requires a greater distance than the available distance in order to stop prior to the position of the unauthorized presence (and therefore, prior to any potential collision), when the aircraft is traveling at a particular speed, at a particular time, and at a particular location.

When the process 1300 determines that the distance does not indicate the potential runway incursion, the process 1300 generates the alert to include the distance of usable runway remaining and a notification that the distance does not indicate a potential runway incursion (step 1310). However, when the process 1300 determines that the distance does indicate the potential runway incursion, the process 1300 generates the alert to include the distance of usable runway remaining and a notification that the distance does indicate a potential runway excursion (step 1312). As described previously with regard to FIGS. 7-8, the alert is a notification presented to ground personnel at air traffic control (ATC) or other ground station and transmitted to the aircraft via the LiFi system for presentation to the flight crew onboard the aircraft. In this scenario, the alert is generated to notify ground personnel and the flight crew of the aircraft of a length of usable runway that is still available for use and whether a potential runway excursion is likely to occur based on current conditions.

Figure 14:
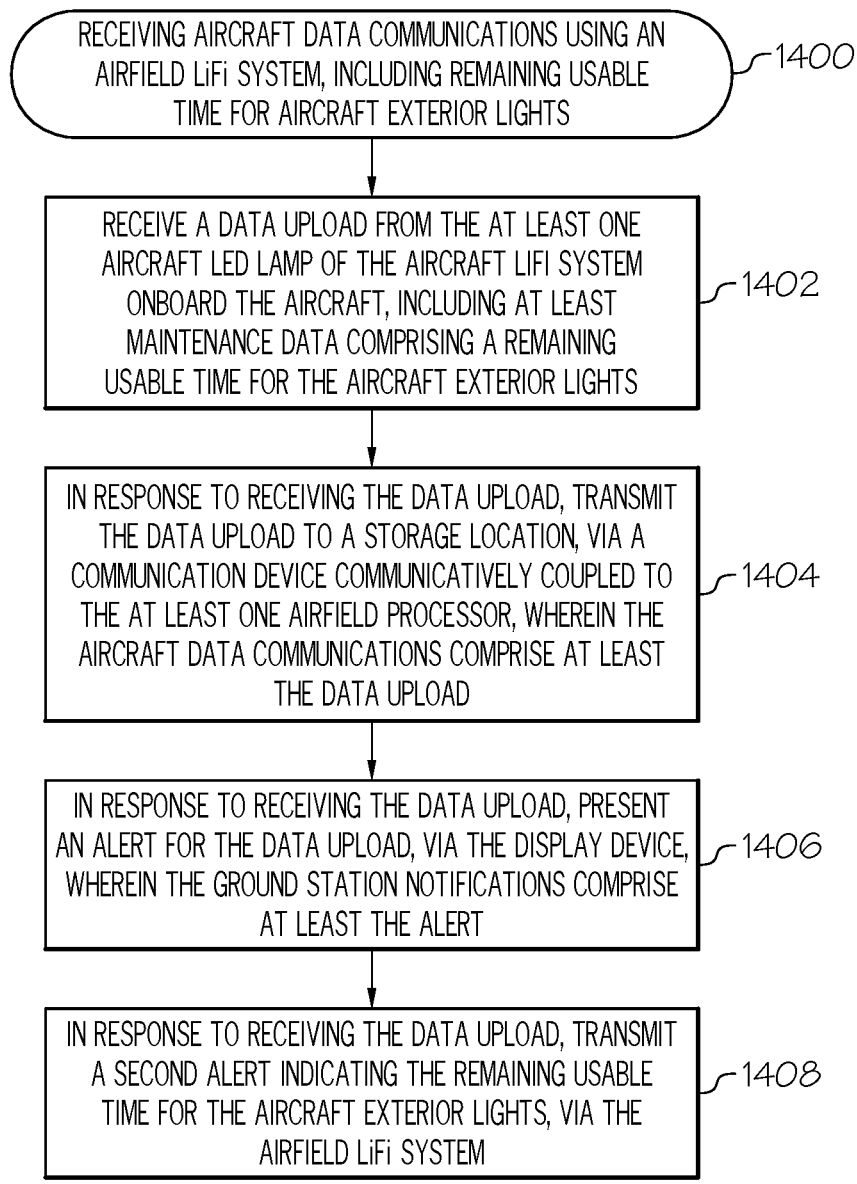
FIG. 14 is a flow chart that illustrates an embodiment of a process for receiving aircraft data communications, including aircraft maintenance data, using an airfield LiFi system, in accordance with the disclosed embodiments.

FIG. 14 is a flow chart that illustrates an embodiment of a process 1400 for receiving aircraft data communications, including aircraft maintenance data, using an airfield LiFi system, in accordance with the disclosed embodiments. In this embodiment, the airfield LiFi system is used as the receiver and an aircraft LiFi system is used as a transmitter, such that the aircraft transmits data to the ground station using the LiFi system. It should be appreciated that the process 1400 described in FIG. 14 represents one embodiment of step 702 described above in the discussion of FIG. 7, including additional detail. More specifically, the process 1400 described in FIG. 14 represents one particular implementation of the process 1200 described previously with regard to FIG. 12.

The process 1400 receives a data upload from the at least one aircraft LED lamp of the aircraft LiFi system onboard the aircraft, including at least maintenance data comprising a remaining usable time for the aircraft exterior lights, via the at least one airfield photo detector (step 1402). Here, the aircraft has transmitted a set of maintenance data to the ground station in the form of a data upload, using an LED beam of light generated by the aircraft LED lamps of the aircraft LiFi system. In this particular embodiment, the set of data transmitted by the aircraft and received by the ground station includes a remaining usable life of the aircraft exterior lights that are used by the aircraft to perform LiFi operations (e.g., to communicate with the airfield LiFi system), and the transmitted set of data informs the ground station personnel of a time duration for continued operation of the aircraft exterior lights. Such maintenance data may be transmitted by the aircraft LiFi system, and received by the airfield LiFi system, to facilitate timely performance of maintenance operations that include replacement of aircraft exterior lights at an appropriate time.

In response to receiving the data upload, the process 1400 transmits the data upload to a storage location, via a communication device communicatively coupled to the at least one airfield processor, wherein the aircraft data communications comprise at least the data upload (step 1404). Here, the data upload is transmitted to a memory storage location and stored for later retrieval and use during maintenance applications, or for aircraft maintenance record-keeping purposes. Also in response to receiving the data upload, the process 1400 presents an alert for the data upload, via the display device, wherein the ground station notifications comprise at least the alert (step 1406). The process 1400 presents the alert for the data upload, to inform ground station personnel that the set of maintenance data has been received from the aircraft, via the airfield LiFi system.

Thus, in the described embodiment, the data upload includes maintenance data from the aircraft, and the process 1400 receives the maintenance data associated with the aircraft exterior lights, via the plurality of airfield photo detectors, wherein the maintenance data comprises at least a remaining usable time for the aircraft exterior lights. In response to receiving the maintenance data, the process 1400 presents a maintenance alert via the display device, wherein the alert includes at least the maintenance alert; and transmits the maintenance alert to the aircraft via the airfield LED lamps. Thus, in this particular embodiment, the process 1400 operates to inform ground station personnel and flight crew personnel of maintenance data including at least a remaining usable time for the aircraft exterior lights.

The various tasks performed in connection with processes 600-1400 may be performed by software, hardware, firmware, or any combination thereof. For illustrative purposes, the preceding descriptions of processes 600-1400 may refer to elements mentioned above in connection with FIGS. 1-5. In practice, portions of processes 600-1400 may be performed by different elements of the described system. It should be appreciated that processes 600-1400 may include any number of additional or alternative tasks, the tasks shown in FIGS. 6-14 need not be performed in the illustrated order, and processes 600-1400 may be incorporated into a more comprehensive procedure or process having additional functionality not described in detail herein. Moreover, one or more of the tasks shown in FIGS. 6-14 could be omitted from embodiments of the processes 600-1400 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIGS. 4-5 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for using an airfield Light Fidelity (LiFi) system in an airfield to exchange optical wireless data communications with an aircraft, the airfield LiFi system comprising at least a plurality of airfield light-emitting diode (LED) lamps, and at least one airfield processor, the method comprising:
   detecting aircraft exterior lights including at least one aircraft LED lamp, via a plurality of airfield photo detectors communicatively coupled to the at least one airfield processor, wherein the airfield LiFi system comprises the plurality of airfield photo detectors positioned at intervals along a runway of the airfield;
   in response to detecting the aircraft exterior lights, establishing a communication connection to an aircraft LiFi system comprising the at least one aircraft LED lamp and at least one aircraft photo detector, by the airfield LiFi system; and
   exchanging the optical wireless data communications via the communication connection, by the airfield LiFi system, by:
      receiving aircraft data communications from the at least one aircraft LED lamp onboard the aircraft, via the plurality of airfield photo detectors;
      transmitting airfield data communications to at least one aircraft photo detector onboard the aircraft, via the plurality of airfield LED lamps, wherein the optical wireless data communications comprise the aircraft data communications and the airfield data communications; and
      presenting ground station notifications associated with at least one of the aircraft data communications and the airfield data communications, via a display device communicatively coupled to the at least one airfield processor, wherein receiving the aircraft data communications further comprises:
         receiving, by the at least one airfield processor, a data upload from the at least one aircraft LED lamp of the aircraft LiFi system onboard the aircraft, the data upload comprising remaining usable time for the aircraft exterior lights, and
         in response to receiving the data upload,
            transmitting the data upload to a storage location, via a communication device communicatively coupled to the at least one airfield processor;
            presenting a maintenance alert via the display device; and
            transmitting the maintenance alert to the aircraft via the plurality of airfield LED lamps.

2. The method of claim 1, further comprising:
   receiving aircraft data from the aircraft via the plurality of airfield photo detectors, by the at least one airfield processor, the aircraft data comprising at least one of an aircraft tail number, aircraft position data, aircraft maintenance recorder data, runway data, time data, and a current aircraft speed, and wherein the aircraft data communications comprise at least the aircraft data;
   determining whether the aircraft currently complies with a published approved flight plan based on the aircraft data, by the at least one airfield processor, wherein flight plan compliance indicates that the aircraft currently complies with the published approved flight plan; and
   when the aircraft does not currently comply with the published approved flight plan,
      transmitting an alert to the aircraft via the plurality of airfield LED lamps, wherein the alert includes a notification that the aircraft does not currently comply with the published approved flight plan, and wherein the airfield data communications comprise the alert; and
      presenting the alert via the display device, wherein the ground station notifications include the alert.

3. The method of claim 1, further comprising:
   computing a current position of the aircraft based on aircraft data received via the plurality of airfield photo detectors, by the at least one airfield processor, wherein the aircraft data communications comprise at least the aircraft data;
   determining whether the current position indicates a potential runway excursion comprising an improper aircraft exit from a current runway or a potential runway incursion comprising an unauthorized presence on the runway; and
   when the current position indicates the potential runway excursion or the potential runway incursion, transmitting an alert to the aircraft via the plurality of airfield LED lamps, wherein the alert includes a notification of the potential runway excursion or the potential runway incursion.

4. The method of claim 3, wherein computing the current position further comprises:
   after establishing the communication connection,
      receiving an aircraft data transmission comprising the aircraft data, via the plurality of airfield photo detectors, the aircraft data including at least an aircraft speed;
      obtaining time data and location data associated with the plurality of airfield photo detectors of the airfield LiFi system; and
      triangulating the current position of the aircraft, based on detecting the aircraft exterior lights, the aircraft speed, the time data, and the location data associated with the plurality of airfield photo detectors.

5. The method of claim 3, wherein determining whether the current position indicates the potential runway excursion further comprises:
calculating a distance of usable runway remaining during operation of the aircraft, based on the current position and runway data, by the at least one airfield processor;
determining whether the distance of usable runway indicates the potential runway excursion, by the at least one airfield processor, based on the current position, an aircraft speed, time data, and location data associated with the plurality of airfield photo detectors of the airfield LiFi system; and
transmitting the alert to the aircraft, via the plurality of airfield LED lamps, wherein the alert includes the distance of usable runway remaining and a second notification that the distance indicates the potential runway excursion.

6. The method of claim 1, wherein transmitting the airfield data communications further comprises:
obtaining a data download for an aircraft onboard system communicatively coupled to the aircraft LiFi system onboard the aircraft, by the at least one airfield processor; and
transmitting the data download to the aircraft onboard system, via the plurality of airfield LED lamps, wherein the airfield data communications comprise at least the data download.

7. The method of claim 6, further comprising:
obtaining a software update for an avionics system, by the at least one airfield processor, wherein the data download comprises at least the software update, and wherein the aircraft onboard system comprises the avionics system;
initiating updating of the avionics system by transmitting the data download via the plurality of airfield LED lamps.

8. The method of claim 6, further comprising:
obtaining media content for an aircraft onboard entertainment system, by the at least one airfield processor, wherein the data download comprises at least the media content, and wherein the aircraft onboard system comprises the aircraft onboard entertainment system;
providing the media content to the aircraft onboard entertainment system by transmitting the data download via the plurality of airfield LED lamps.

9. An airfield Light Fidelity (LiFi) system positioned in an airfield and used to exchange optical wireless data communications with an aircraft, the airfield LiFi system comprising:
a plurality of airfield LED lamps configured to transmit the optical wireless data communications to an aircraft LiFi system onboard the aircraft, the plurality of airfield LED lamps being positioned at intervals along a runway of the airfield;
a plurality of airfield photo detectors configured to receive the optical wireless data communications from the aircraft LiFi system, the plurality of airfield photo detectors being positioned at intervals along a runway of the airfield;
a communication device configured to transmit external data;
a display device configured to present graphical elements and text for the airfield LiFi system; and
at least one airfield processor communicatively coupled to the plurality of airfield LED lamps, the plurality of airfield photo detectors, the communication device, and the display device, the at least one airfield processor configured to:
detect aircraft exterior lights including at least one aircraft LED lamp, via the plurality of airfield photo detectors;
in response to detecting the aircraft exterior lights, establish a communication connection to the aircraft LiFi system comprising the at least one aircraft LED lamp and at least one aircraft photo detector; and
exchange the optical wireless data communications via the communication connection, by:
receiving aircraft data communications from the at least one aircraft LED lamp onboard the aircraft, via the plurality of airfield photo detectors;
transmitting airfield data communications to at least one aircraft photo detector onboard the aircraft, via the plurality of airfield LED lamps, wherein the optical wireless data communications comprise the aircraft data communications and the airfield data communications; and
presenting ground station notifications associated with at least one of the aircraft data communications and the airfield data communications, via the display device,
wherein the at least one airfield processor is further configured to:
receive, via the plurality of airfield photo detectors, a data upload from the at least one aircraft LED lamp of the aircraft LiFi system onboard the aircraft, the data upload comprising maintenance data associated with the aircraft exterior lights, wherein the maintenance data comprises at least a remaining usable time for the aircraft exterior lights; and
in response to receiving the data upload,
transmit the data upload to a storage location, via the communication device communicatively coupled to the at least one airfield processor, wherein the aircraft data communications comprise at least the data upload;
present a maintenance alert via the display device; and
transmit the maintenance alert to the aircraft via the plurality of airfield LED lamps.

10. The airfield LiFi system of claim 9, wherein the at least one airfield processor is further configured to:
receive aircraft data from the aircraft via the plurality of airfield photo detectors, the aircraft data comprising at least one of an aircraft tail number, runway data, time data, and a current aircraft speed, and wherein the aircraft data communications comprise at least the aircraft data;
determine whether the aircraft currently complies with a published approved flight plan based on the aircraft data, wherein flight plan compliance indicates that the aircraft currently complies with the published approved flight plan; and
when the aircraft does not currently comply with the published approved flight plan,
transmit an alert to the aircraft via the plurality of airfield LED lamps, wherein the alert includes a notification that the aircraft does not currently comply with the published approved flight plan, and wherein the airfield data communications comprise the alert; and
present the alert via the display device, wherein the ground station notifications include the alert.

11. The airfield LiFi system of claim 9, wherein the at least one airfield processor is further configured to:
- compute a current position of the aircraft based on aircraft data received via the plurality of airfield photo detectors, wherein the aircraft data communications comprise at least the aircraft data;
- determine whether the current position indicates a potential runway excursion comprising an improper aircraft exit from a current runway; and
- when the current position indicates the potential runway excursion, transmit an alert to the aircraft via the plurality of airfield LED lamps, wherein the alert includes a notification of the potential runway excursion.

12. The airfield LiFi system of claim 11, wherein the at least one airfield processor is further configured to compute the current position, by:
- after establishing the communication connection,
  - receiving an aircraft data transmission comprising the aircraft data, via the plurality of airfield photo detectors, the aircraft data including at least an aircraft speed;
  - obtaining time data and location data associated with the plurality of airfield photo detectors of the airfield LiFi system; and
  - triangulating the current position of the aircraft, based on detecting the aircraft exterior lights, the aircraft speed, the time data, and the location data associated with the plurality of airfield photo detectors.

13. The airfield LiFi system of claim 11, wherein the at least one airfield processor is further configured to determine whether the current position indicates the potential runway excursion, by:
- calculating a distance of usable runway remaining during operation of the aircraft, based on the current position and runway data;
- determining whether the distance of usable runway indicates the potential runway excursion to generate an indication of potential runway excursion, based on the current position, an aircraft speed, time data, and location data associated with the plurality of airfield photo detectors of the airfield LiFi system; and
- transmitting the alert to the aircraft, via the plurality of airfield LED lamps, wherein the alert includes the distance of usable runway remaining and a second notification that the distance indicates the potential runway excursion.

14. The airfield LiFi system of claim 9, wherein the at least one airfield processor is further configured to transmit the airfield data communications, by:
- obtaining a data download for an aircraft onboard system communicatively coupled to the aircraft LiFi system onboard the aircraft; and
- transmitting the data download to the aircraft onboard system, via the plurality of airfield LED lamps, wherein the airfield data communications comprise at least the data download.

15. The airfield LiFi system of claim 14, wherein the at least one airfield processor is further configured to:
- obtain a software update for an avionics system, wherein the data download comprises at least the software update, and wherein the aircraft onboard system comprises the avionics system;
- initiate updating of the avionics system by transmitting the data download via the plurality of airfield LED lamps.

16. The airfield LiFi system of claim 14, wherein the at least one airfield processor is further configured to:
- obtain media content for an aircraft onboard entertainment system, wherein the data download comprises at least the media content, and wherein the aircraft onboard system comprises the aircraft onboard entertainment system;
- providing the media content to the aircraft onboard entertainment system by transmitting the data download via the plurality of airfield LED lamps.

\* \* \* \* \*